United States Patent [19]
Kuslak et al.

[11] Patent Number: 5,434,986
[45] Date of Patent: Jul. 18, 1995

[54] INTERDEPENDENCY CONTROL OF PIPELINED INSTRUCTION PROCESSOR USING COMPARING RESULT OF TWO INDEX REGISTERS OF SKIP INSTRUCTION AND NEXT SEQUENTIAL INSTRUCTION

[75] Inventors: John S. Kuslak, Blaine; Buraimoh Adebayo, East Bethel, both of Minn.

[73] Assignee: Unisys Corporation, Blue Bell, Pa.

[21] Appl. No.: 268,677

[22] Filed: Jun. 30, 1994

Related U.S. Application Data

[63] Continuation of Ser. No. 818,531, Jan. 9, 1992, abandoned.

[51] Int. Cl.⁶ ............................ G06F 9/26; G06F 9/30
[52] U.S. Cl. ............................ 395/375; 364/DIG. 1; 364/261.3; 364/247.5; 364/231.8
[58] Field of Search .................................. 395/375

[56] References Cited

U.S. PATENT DOCUMENTS

| | | | |
|---|---|---|---|
| 3,577,190 | 4/1971 | Cocke et al. ............. | 395/375 |
| 4,212,060 | 7/1980 | Prey ....................... | 395/375 |
| 4,370,711 | 1/1983 | Smith . | |
| 4,390,946 | 6/1983 | Lane . | |
| 4,477,872 | 10/1984 | Losq et al. . | |
| 4,604,691 | 8/1986 | Akagi . | |
| 4,679,141 | 7/1987 | Pomerene et al. . | |
| 4,714,994 | 12/1987 | Oklobdzija et al. ........ | 395/375 |
| 4,725,947 | 2/1988 | Shonai et al. ............. | 395/375 |
| 4,755,966 | 7/1988 | Lee et al. . | |
| 4,763,245 | 9/1988 | Emma et al. . | |
| 4,764,861 | 8/1988 | Shibuya . | |
| 4,777,587 | 10/1988 | Case et al. ................. | 395/375 |
| 4,777,594 | 10/1988 | Jones et al. . | |
| 4,827,402 | 5/1989 | Wada . | |
| 4,831,517 | 5/1989 | Crouse et al. . | |
| 4,847,753 | 7/1989 | Matsuo et al. . | |
| 4,853,840 | 8/1989 | Shibuya . | |
| 4,855,904 | 8/1989 | Daberkow et al. . | |
| 4,858,104 | 8/1989 | Matsuo et al. . | |
| 4,860,197 | 8/1989 | Langendorf et al. ....... | 395/375 |
| 4,860,199 | 8/1989 | Langendorf et al. . | |
| 4,870,573 | 9/1989 | Kawata et al. . | |
| 4,881,170 | 11/1989 | Morisada ................... | 395/375 |
| 4,890,225 | 12/1989 | Ellis, Jr. et al. . | |
| 4,894,772 | 1/1990 | Langendorf . | |
| 4,910,664 | 3/1990 | Arizono . | |
| 4,912,635 | 3/1990 | Nishimukai et al. . | |
| 4,914,579 | 4/1990 | Putrino et al. . | |

(List continued on next page.)

OTHER PUBLICATIONS

Dwyer et al; "A Fast Instruction Dispatch Unit for Multiple & Out of Sequence Issuances"; EE-CFG-8-7-15 pp. 1-11 and Drawings FIGS. 1-9.

Smith et al; "Implementing Precise Interrupts in Pipelined Processors"; IEEE; vol. 37 No. 5 1988-pp. 562-573.

Wu et al; "Cheekpoint Repair for Out-of-Order Execution Machines"; ACM 1987, pp. 18-26.

Sohi et al; "Instruction Issue Logic for High-Performance, Interruptable Pipelined Processors"; ACM 1987; pp. 27-34.

*Primary Examiner*—Krisna Lim
*Attorney, Agent, or Firm*—Nawrocki, Rooney & Sivertson

[57] ABSTRACT

An apparatus for and method of controlling branching conditions within a pipelined instruction processor. For jump instructions, a memory is used to store the target address of branches actually taken as a function of the absolute address of the jump instruction. The next time the same jump instruction is executed, the branch is assumed and the target address is supplied to the instruction pipeline for prefetching of the target instruction. If the conditional branch instruction is a skip instruction, interdependency of the Nth and N+1st instructions are determined by comparison of the index register fields. If no dependency is found, fully pipelined operation is continued. If a dependency is found, the system is depiped for one clock cycle to prevent the N+1st instruction from using an index register which has not been updated as anticipated by the software developer.

5 Claims, 13 Drawing Sheets

U.S. PATENT DOCUMENTS

| | | |
|---|---|---|
| 4,916,602 | 4/1990 | Itoh . |
| 4,924,376 | 5/1990 | Ooi . |
| 4,926,312 | 5/1990 | Nukiyama . |
| 4,926,323 | 5/1990 | Baror et al. . |
| 4,942,520 | 7/1990 | Langendorf . |
| 4,953,121 | 8/1990 | Muller . |
| 4,964,046 | 10/1990 | Mehrgardt et al. . |
| 4,984,154 | 1/1991 | Hanatani et al. . |
| 5,008,807 | 4/1991 | Krueger et al. . |
| 5,032,983 | 7/1991 | Fu et al. ............................... 395/375 |
| 5,050,068 | 9/1991 | Dollas et al. . |
| 5,081,574 | 1/1992 | Larsen et al. ....................... 395/375 |
| 5,121,473 | 6/1992 | Hodges ................................ 395/375 |
| 5,142,630 | 8/1992 | Ishikawa ............................. 395/375 |
| 5,142,634 | 8/1992 | Fite et al. ............................ 395/375 |
| 5,210,831 | 5/1993 | Emma et al. ........................ 395/375 |
| 5,228,131 | 7/1993 | Ueda et al. .......................... 395/375 |
| 5,237,666 | 8/1993 | Suzuki et al. ....................... 395/375 |

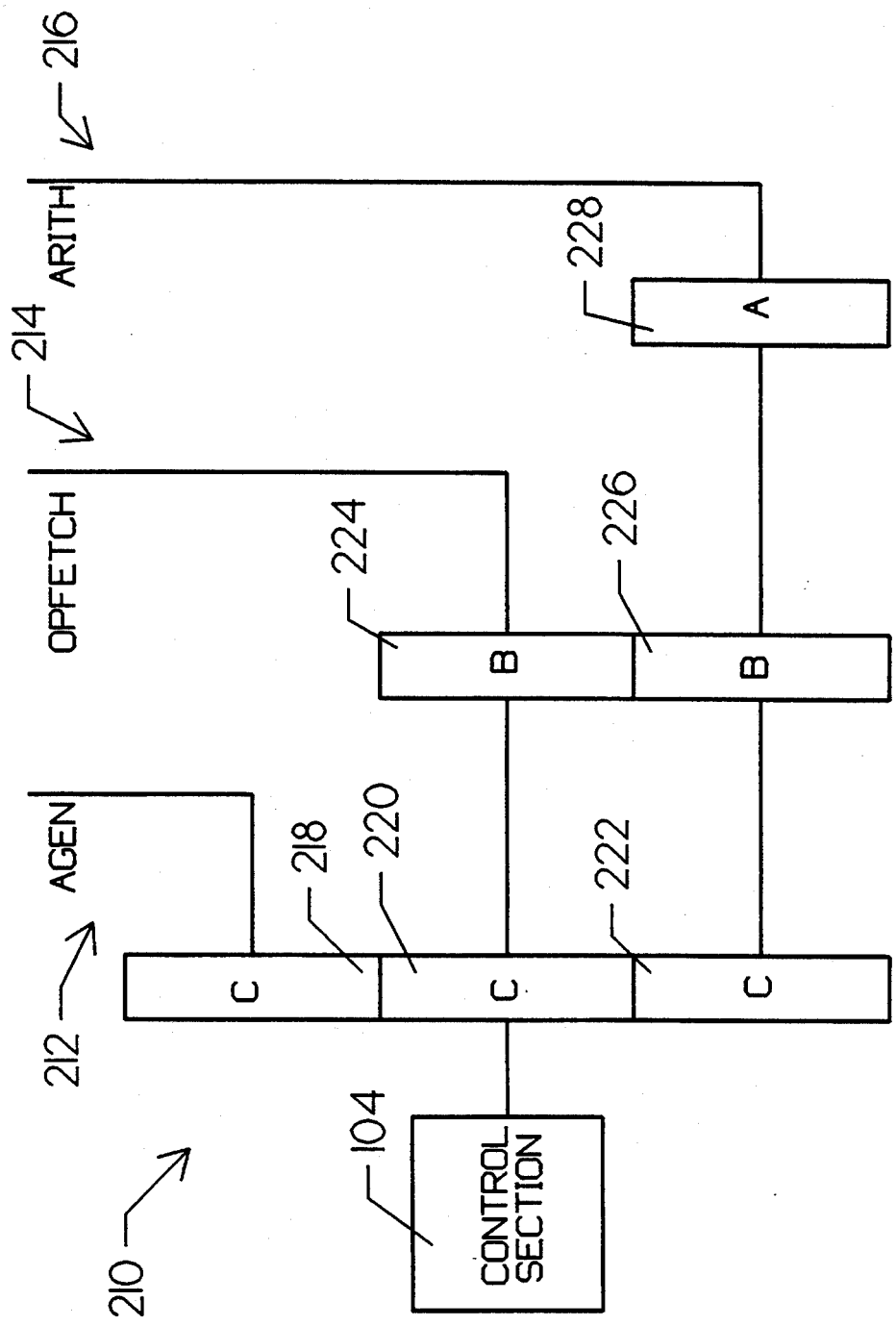

INTERDEPENDENCY CONTROL OF PIPELINED INSTRUCTION PROCESSOR USING COMPARING RESULT OF TWO INDEX REGISTERS OF SKIP INSTRUCTION AND NEXT SEQUENTIAL INSTRUCTION

This is a continuation of application Ser. No. 07/818,531, filed on Jan. 9, 1992, now abandoned.

CROSS REFERENCE TO CO-PENDING APPLICATIONS

The present application is related to U.S. patent application Ser. No. 08/288,651, filed on Aug. 9, 1994, which is a continuation of U.S. patent application Ser. No. 07/762,282, filed on Sep. 19, 1991, now abandoned, entitled "PROCESSOR CONTROL SYSTEM USING SEPARATE HARDWARE AND MICROCODE CONTROL SIGNALS TO CONTROL THE PIPELINED EXECUTION OF MULTIPLE CLASSES OF MACHINE INSTRUCTIONS", and U.S. patent application Ser. No. 08/235,196, filed on Apr. 29, 1994, which is a continuation of U.S. patent application Ser. No. 07/762,276, filed on Sep. 19, 1991, now abandoned, entitled "DATA COHERENCY PROTOCOL FOR MULTI-LEVEL CACHED HIGH PERFORMANCE MULTIPROCESSOR SYSTEM", both assigned to the assignee of the present invention arid both incorporated herein by reference.

BACKGROUND OF THE INVENTION

1. Field of the Invention

The present invention generally relates to general purpose digital data processing systems and more particularly relates to such systems which employ pipelined execution of program instructions.

2. Description of the Prior Art

In most general purpose, stored program, digital computers, software is developed under the assumption that program instructions are executed in their entirety in a sequential fashion. This frees the software developer from the need to account for potential problems associated with initial processing of an instruction before completion of the preceding instruction. However, most large scale modern machines are designed to take advantage of the overlapping of various functions. In its simplest form, such overlapping permits instruction processing of the N+1st instruction to be performed during operand processing of the Nth instruction. U.S. Pat. No. 4,890,225 issued to Ellis, Jr. et al. shows a rudimentary overlapped machine. To free the software developer from concerns about non-sequentiality, Ellis Jr. et al. store the machine state during the complete execution of the Nth instruction. U.S. Pat. No. 4,924,376 issued to Ooi provides a technique for resource allocation in an overlapped environment.

A more general form of overlapping is termed a pipelined environment. In implementing such a machine, the designer dedicates certain hardware resources to the various repetitive tasks. The performance advantage in this dedication comes from employing these dedicated hardware elements simultaneously. Typically, this means that instruction decode, operand fetch, and arithmetic operations each have separate and dedicated hardware resources. Even though the Nth instruction is processed by each of these hardware resources sequentially, each separate hardware resource is deployed on a different instruction simultaneously. The N+1st instruction may be processed by the instruction fetch and decode hardware, while the Nth instruction is being processed by the operand fetch hardware and while the N−1st instruction is being processed by the arithmetic hardware. U.S. Pat. No. 4,855,904 issued to Daberkow, et al. describes a pipelined architecture.

The most common problem encountered occurs with branching instructions. If the system assumes that the instruction to be executed immediately after the Nth instruction is located at the next sequential address, all branches pose a potential problem. U.S. Pat. No. 4,604,691 issued to Akagi discusses a system in which instructions are prefetched to provide the performance advantage of overlapped operation. The system of Akagi attempts to predict whether a particular branch will be taken to prevent the performance degradation associated with prefetching of an incorrect instruction.

It becomes even more beneficial to properly accommodate branching instructions within a pipelined environment as indicated in U.S. Pat. No. 4,860,199 issued to Langendorf et al. In U.S. Pat. No. 4,916,602 issued to Itoh, the address of the next sequential microcode instruction is computed. If the previous instruction is then determined to indicate a branch, the branch target address is substituted for the next sequential address. U.S. Pat. No. 4,390,946 issued to Lane describes a pipelined system in which it is assumed that a branch will not be taken. If the branch actually occurs, the system is "depiped" for one clock cycle thereby degrading performance. A similar performance degradation occurs for a conditional skip instruction as discussed in U.S. Pat. No. 4,926,312 issued to Nukiyama. In this system if the conditional skip is taken, the next sequential instruction is invalidated after having been fetched and a no-op is executed instead. This corresponds to depiping the system for the period of time corresponding to the execution of the no-op instruction. A portion of this problem is mitigated by duplicating some of the hardware used for addressing as suggested by U.S. Pat. No. 4,827,402 issued to Wada.

One manner of preventing the performance degradation caused by branching is to force the instruction processor not to branch. U.S. Pat. No. 4,870,573 issued to Kawata et al. uses this method for test purposes. U.S. Pat. No. 4,831,517 issued to Crouse et al. describes the unique problem associated with branches which return on address (i.e. return jumps). Optimization of branch conditions in loop processing is discussed in U.S. Pat. No. 4,910,664 issued to Arizono.

Both the jump target address and corresponding target instruction are stored within the instruction cache of the system described in U.S. Pat. No. 4,847,753 issued to Matsua et al. Target instructions are also saved in the instruction processor of U.S. Pat. No. 4,926,323 issued to Baror et al. U.S. Pat. No. 4,942,520 issued to Langendorf shows a technique for accessing target branch instructions using an index to an instruction cache memory. Through the use of an associative memory, U.S. Pat. No. 4,912,635 issued to Nishimukai et al. simplifies the target instruction addressing. The system of U.S. Pat. No. 4,894,772 issued to Langendorf also uses an associative memory.

A branch history table is used along with an associative memory in U.S. Pat. No. 4,764,861 issued to Shibuya; U.S. Pat. No. 4,984,154 issued to Hanatani et al; and U.S. Pat. No. 4,853,840 issued to Shibuya. U.S. Pat. No. 4,477,872 issued to Losq et al. employs a decode time history table for predicting whether a conditional branch will or will not be taken. Another type of branch prediction circuit is shown in U.S. Pat. No. 4,370,711 issued to Smith. The branch history table is expanded to include both active and passive sections in U.S. Pat. No. 4,679,141 issued to Pomerence et al.

There are a number of techniques employed in the attempt to improve the accuracy of prediction for conditional branches. U.S. Pat. No. 4,763,245 issued to Emma et al. examines the operand to improve prediction accuracy. Operands are similarly used for branch prediction in U.S. Pat. No. 4,914,579 issued to Putrino et al. In U.S. Pat. No. 4,755,966 issued to Lee et al. a larger displacement of the potential branch as determined from the instruction operand, is assumed to represent less likelihood of taking a conditional branch. U.S. Pat. No. 4,777,594 issued to Jones et al. monitors instruction flow to assist in conditional branch prediction. The branch prediction table is accessed using information from the instruction prior to the conditional branch instruction in U.S. Pat. No. 4,858,104 issued to Matsuo et al.

SUMMARY OF THE INVENTION

The present invention overcomes many of the disadvantages of the prior art by providing a machine having the performance enhancement of staged microcode control which provides the facilities for effectively controlling execution of non-sequential instructions. The control technique applies to both skips and jumps whether conditional or unconditional. The control scheme preserves pipelined operation in most situations. For unsuccessful prediction, the performance penalty is no worse than without branch control.

As jump instructions are encountered, a record is made of whether the jump is taken (i.e. next instruction executed is located at the branch target address) or not taken (i.e. next instruction follows sequentially). If the branch occurs, the target address is saved for further use. When jump prediction is enabled, the instructions at the target address are prefetched for jump instructions wherein the branch had been taken for the previous execution. The next sequential instruction is prefetched if jump prediction is disabled or if the branch was not taken at the previous execution.

Unconditional jumps are always correctly predicted (following the first execution) using a minimum of hardware whenever jump prediction is enabled. Similarly, when jump prediction is enabled, the jump is always correctly predicted if the branch or not branch is the same as the previous execution. The jump prediction mode is easily enabled and disabled. The normal performance penalty for incorrect prediction is the same depiped delay as would be experienced for branches taken with no jump prediction or when the jump prediction mode is disabled.

Skip instructions are a special case in branching. The instruction normally does or does not skip the next sequential instruction conditioned on the contents of an indexing register. That means that execution of instruction N (i.e. a skip instruction) will be immediately followed by execution of instruction N+1 which depends upon the N+1 indexing and requires N+1 to be a single pipe instruction.

According to the preferred mode of the present invention, interdependency of the Nth and N+1st instructions is determined from the x incrementation, if any, specified by each. If the Nth and N+1st instructions specify the same, non-zero, index register, interdependency is assumed. To compensate for this interdependency, the instruction execution pipeline is depiped for one clock cycle to permit the Nth instruction to increment the designated index register before the N+1st instruction uses that designated index register for memory access.

The present invention utilizes a minimum of hardware resources to preserve the performance advantages of pipelined operation for most branch and skip conditions. In those situations in which the prediction is disabled or incorrect, there is no additional penalty.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 6B shows the general control scheme for the three position pipeline;

DETAILED DESCRIPTION OF THE PREFERRED EMBODIMENTS

Figure 1:
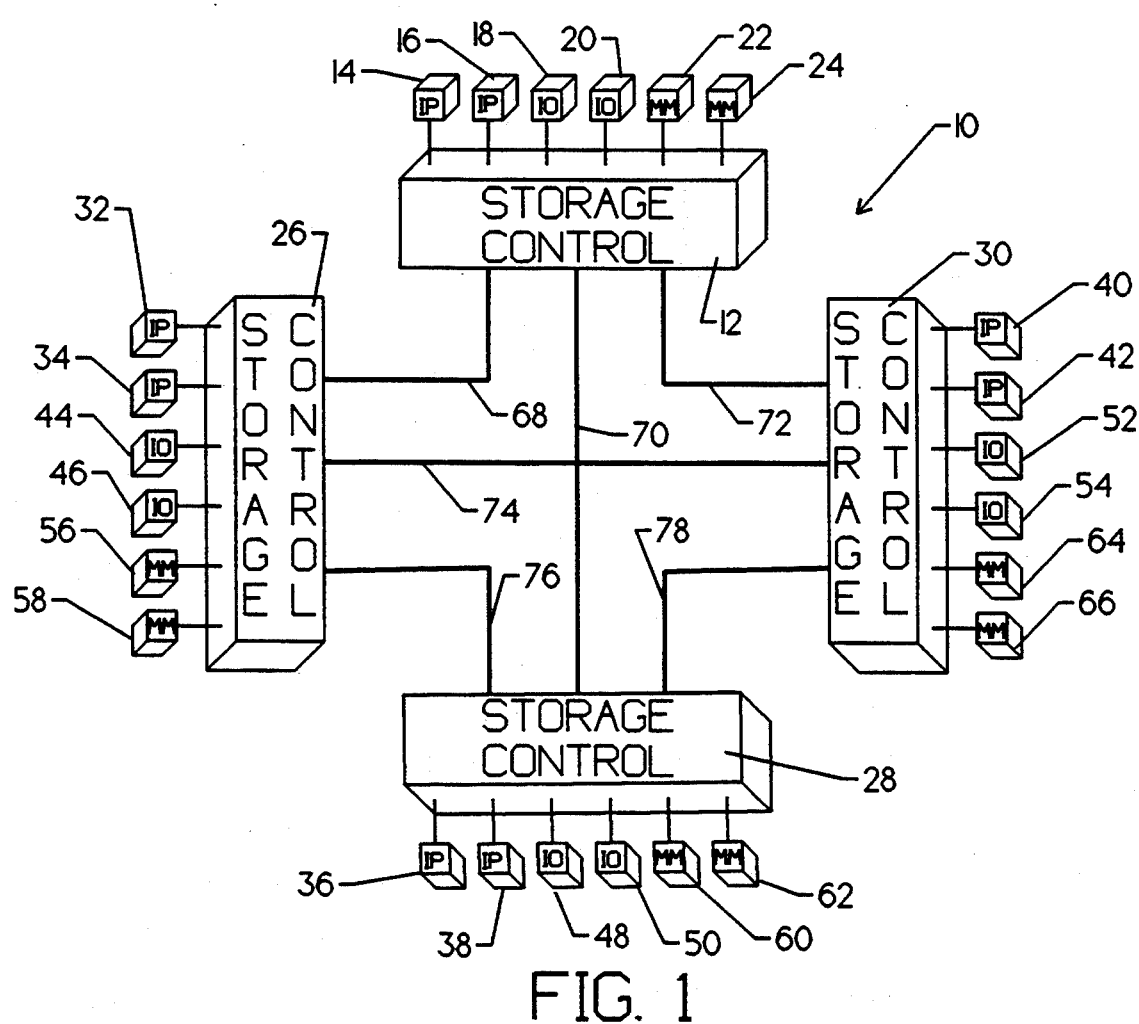
FIG. 1 is a schematic diagram of a fully populated data processing system incorporating the present invention.

FIG. 1 is an overall diagram of fully populated data processing system 10 according to the present invention. Data processing system 10 includes four individual processing clusters, each having its own storage controller and each having point-to-point communication with the other clusters via a storage controller to storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above referenced and commonly assigned co-pending U.S. Pat. Application which has been incorporated by reference.

Input/output processors 18 and 20, along with main memory modules 22 and 24, may be elements currently available, such as found in the Unisys Model 2200/600 series. Input/output processors 44, 46, 48, 50, 52, and 54 and main memory modules 56, 58, 60, 62, 64, and 66 may be similarly found.

Figure 2:
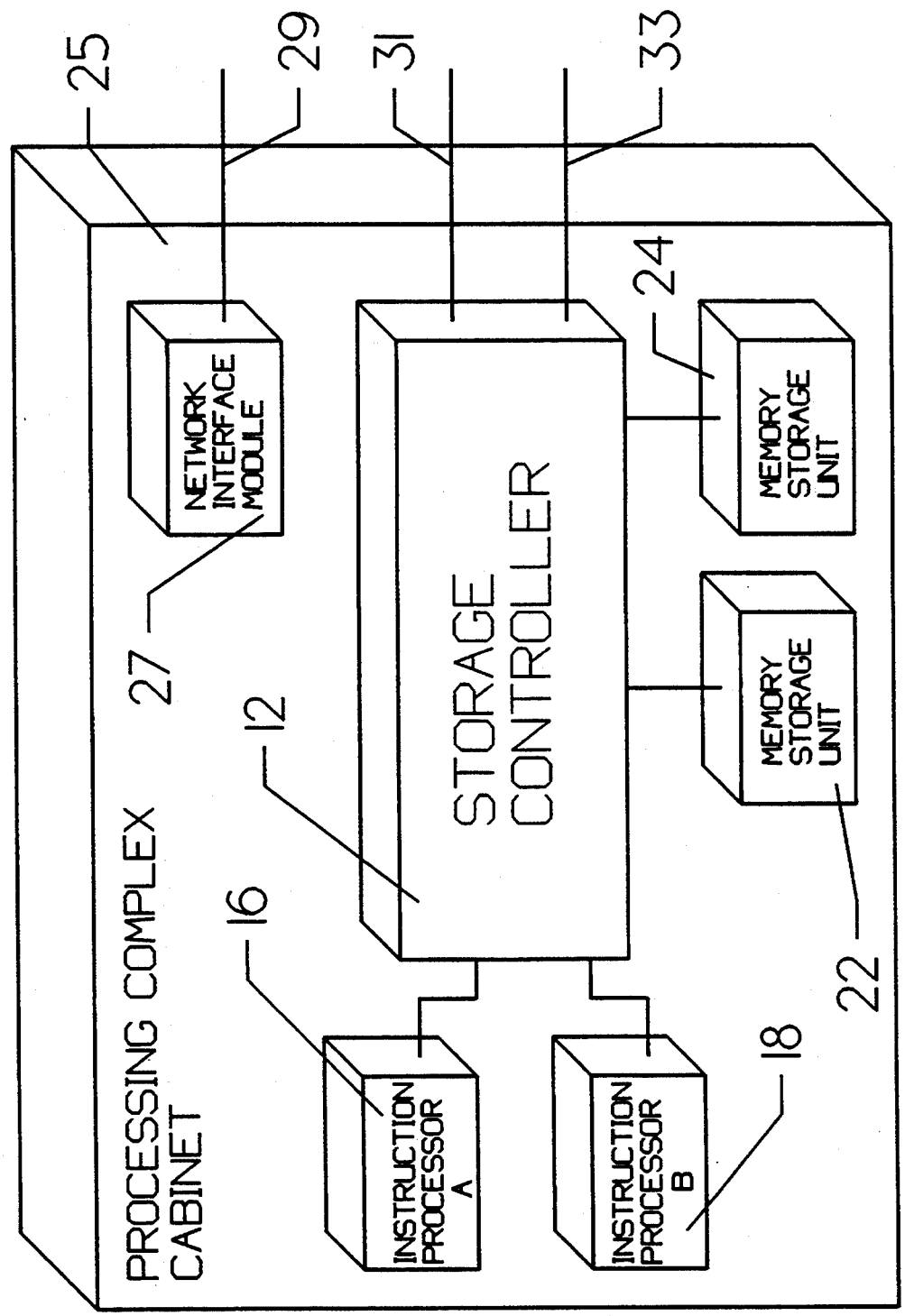
FIG. 2 is a pictorial diagram showing the packaging arrangement of the data processing system of FIG. 1.

FIG. 2 is a schematic diagram showing the packaging of a portion of data processing system 10. A major physical element of data processing system 10 is Processing Complex Cabinet, PCC 25. Within fully populated PCC 25 is located instruction processors 16 and 18 (i.e. IPA and IPB). In the preferred mode, each of these instruction processors is packaged on a single high density circuit board. The memory storage units 22 and 24 are coupled to storage controller 12 as explained above.

Network interface module (i.e. NIM) 27 provide an interface to the operator console via cable 29. Cables 31 and 33 couple input/output units 18 and 20 (see also FIG. 1) to storage controller 12. Input/output units 18 and 20 are physically packaged in an Input/output Complex Cabinet (i.e. ICC) which is not shown for clarity. Other referenced elements are as previously described.

Figure 3:
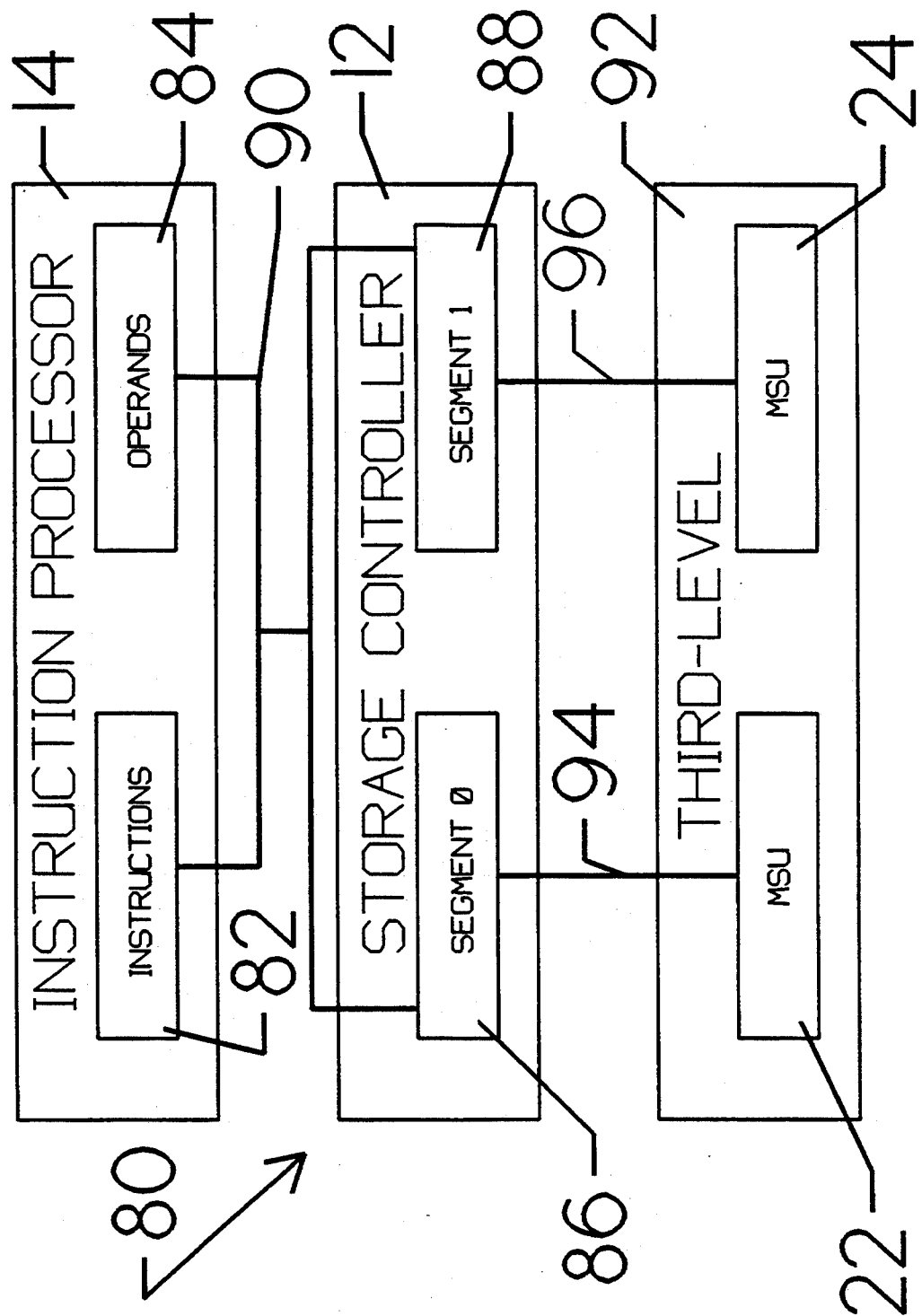
FIG. 3 is a schematic diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8 k of 36 bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36 bit words containing the desired data element. A more detailed explanation of the operation of instruction cache 82 and operand cache 84 is found below.

Storage controller 12 contains an intermediate level cache segment of 128 k 36 bit words for each for each main memory module within the cluster. In the present illustration, storage controller 12 contains segment 0 cache 86 and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output processors, and three other storage controllers (see also FIG. 1). Each data element request is divided between segment 0 cache 86 and segment 1 cache 88 based upon requested address. Only if the requested data element is not validly present in the appropriate intermediate level cache resource is an access request made to third level 92.

Figure 4:
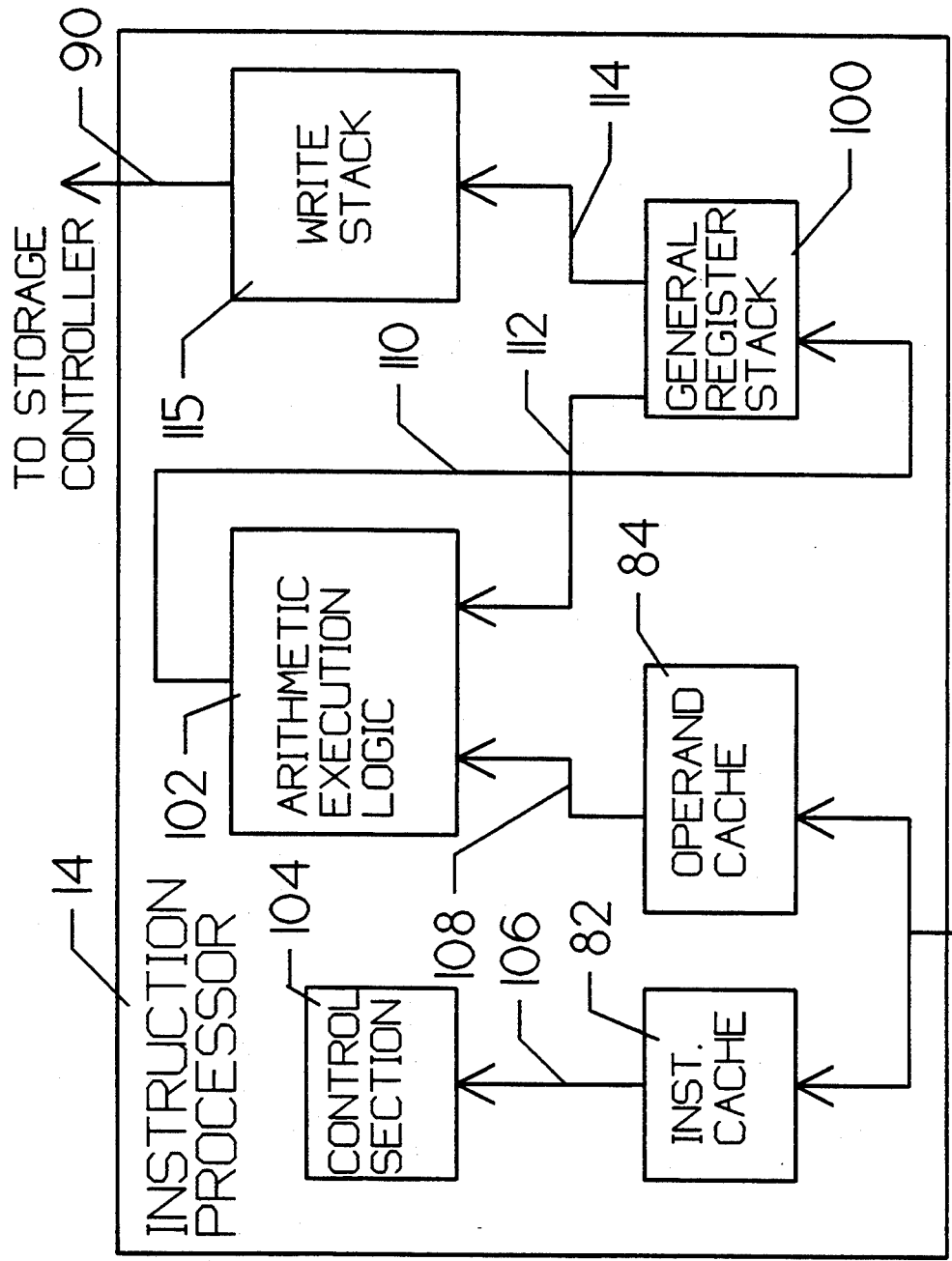
FIG. 4 is a simplified block diagram showing the major elements of the instruction processor.

FIG. 4 is a simplified block diagram of instruction processor 14 showing the major data and control paths. Cable 90, providing the data transfer path between storage controller 12 and instruction processor 14, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 14. Cable 90 also couples write data from write stack 115 to storage controller 12 for longer term storage. Priority for this shared interface is ordinarily given to read data requests requiring write data to be queued in write stack 115. The exception to giving priority to read data is whenever data is to be read from a location for which a write access has been queued.

Instructions from instruction cache 82 are provided via path 106 to control section 104 for decoding via microcode controller and hardwired control logic. Arithmetic execution logic 102 receives operand data via path 108 and performs the specified operation using a combination of microcode control and hardwired control as explained in greater detail below.

Most arithmetic instructions operate upon data which is temporarily stored in general register stack 100. This permits most rapid access to the data, because that data is directly accessed from an extremely fast storage stack. Similarly, arithmetic results are often returned to general register stack 100 for temporary storage until further arithmetic processing. Data is routed to general register stack 100 by path 110. Data from general register stack 100 is routed back to arithmetic execution logic 102 via path 112 and to write stack 115 via path 114. The data transferred to write stack 115 is queued for storage by storage controller 12 as discussed above.

Figure 5:
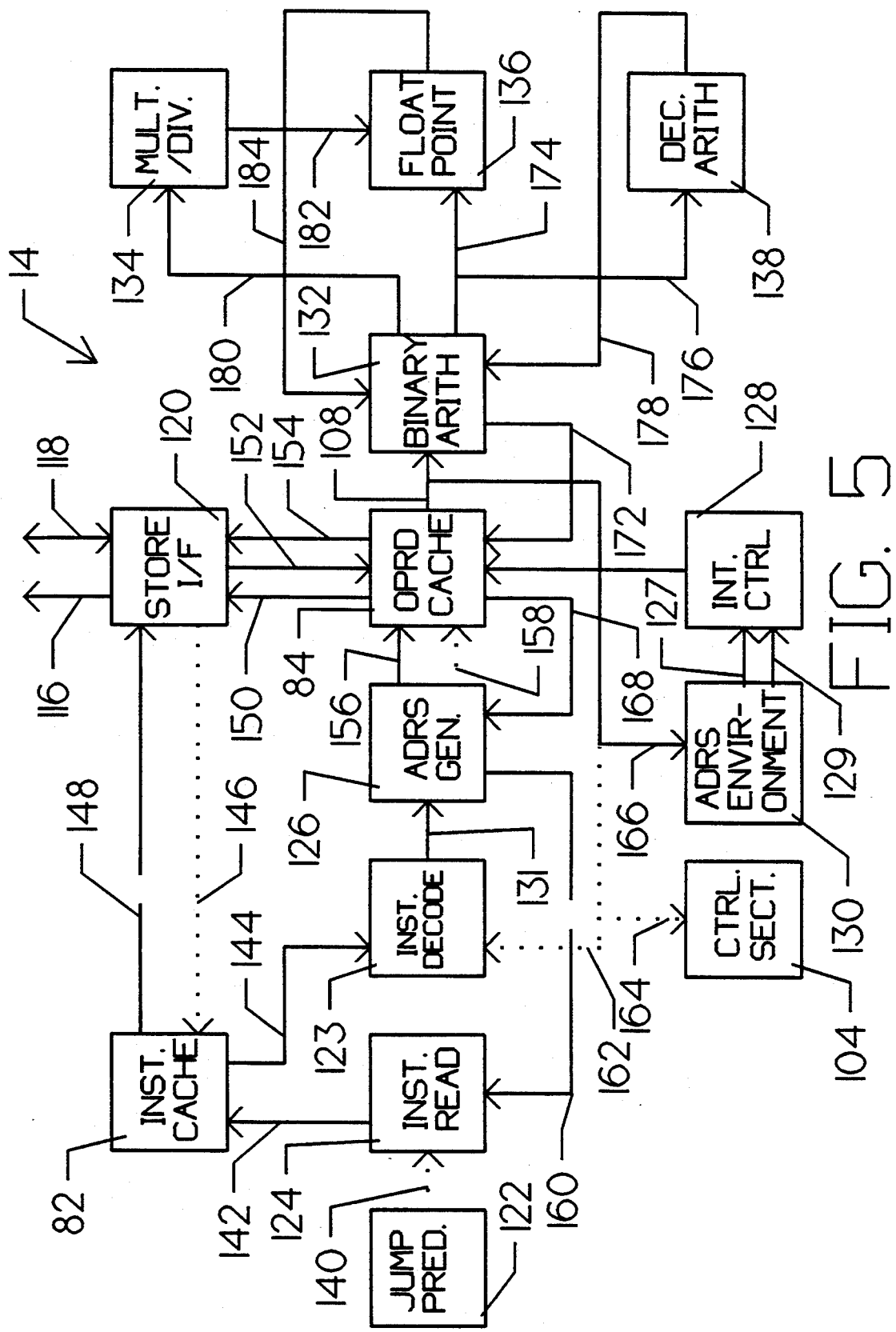
FIG. 5 is a detailed block diagram of the instruction processor.

FIG. 5 is a more detailed block diagram of instruction processor 14. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 12 is via cable 90, as described above. It consists of write cable 116 and read/write cable 118. Each of these data paths couples a 72 bit double word in parallel fashion. The function of write stack 115 (see also FIG. 4) is incorporated within store interface 120 which also provides the request/acknowledge synchronization logic. Addressing information for store interface 120 is sent from instruction cache 82 via cable 148 and operand cache 84 via cable 150 for a corresponding cache miss. Instructions are sent to instruction cache 82 via path 146. Because instructions are 36 bit words, path 146 has a width of 36 bits. Operand data read by storage controller 12 is transferred from store interface 120 to operand cache 84 by path 152. Similarly, write operand data is sent from operand cache 84 to store interface 120 via path 154. Both path 152 and path 154 have a width of 72 bits to accommodate double word operands.

Instructions to be executed are addressed by instruction read 124. The addresses are computed using one of the base registers located within address environment 130. If the instruction is the next sequential instruction, its address is determined by incrementing the program address counter. If the instruction to be executed is addressed by a branch or jump instruction, the address may be computed by address generator 126 and supplied via path 160. Alternatively, the address may be supplied by jump prediction 122 via path 140 during operation in the jump prediction mode as explained in detail below. The address of the next instruction is provided to instruction cache 82 via path 142.

The next addressed instruction is fetched from instruction cache 82 if a match is found. If the request results in a cache miss, storage controller 12 is requested to read the memory block containing the instruction as discussed above. In either case, the instruction is provided to instruction decoder 123 via path 144. The instruction is decoded through the use of a microcode controller by instruction decode 123, and the operand address is computed by address generator 126 from the data received via path 131.

Operand cache 84 contains general register stack 100 (see also FIG. 4). The cache is addressed by the output of address generator 126 received from path 158. Direct operands are received on path 156. If a match is not made in operand cache 84, a read request is made of storage controller 12 through store interface 120 as explained above. If a match is found in operand cache 84 or if the instruction specifies a direct operand received on path 156, the operand data is more immediately produced. In either case, the operand data is routed in accordance with the operation to be performed as specified by the instruction. Indirect operands cause the new operand address to be transferred to address generator 126 via path 168. Operands are transferred to binary arithmetic 132 for mathematical computation via path 108 or to address environment 130 via path 166.

Binary arithmetic 132 provides the basic control for all arithmetic operations to be performed on data received via path 108. Floating point operations are scaled and controlled by floating point logic 136 which receives operand data on path 174. Floating point results are returned to binary arithmetic 132 by path 184. Mult./div. 134 performs the basic multiplication and division operations for fixed point instructions. Operand data is received via path 180 and the products/quotients returned via path 182 and floating point logic 136. Decimal arithmetic 138 receives operand data on path 176 and returns results via path 178. Decimal arithmetic performs special purpose decimal operations.

Another category of instructions involves a change to the base registers within the addressing environment 130. The data is supplied to addressing environment 130 via path 166. Base register contents are supplied to interrupt control 128 via paths 127 and 129. Interrupt control 128 provides the interrupt data to operand cache 84 via path 170. Control section 104 provides the overall microcode control.

The operation of instruction processor 14 is intended to occur in the pipelined mode whenever feasible. The preferred mode utilizes a three stage pipeline. The timing of this pipelined operation may be found below and in the above referenced co-pending application which has been incorporated herein by reference. The remaining referenced components are as previously discussed.

Figure 6A:
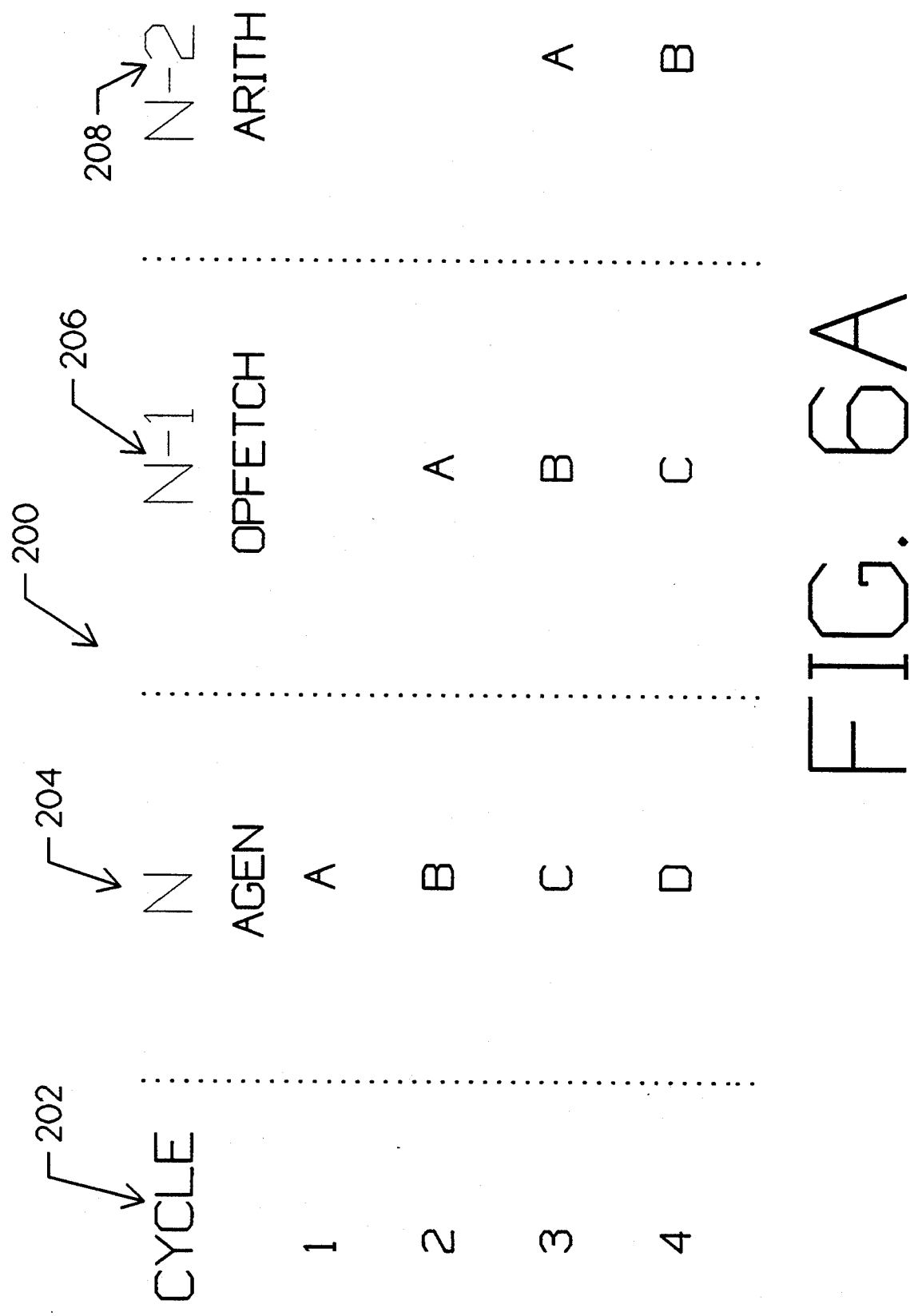
FIG. 6A schematically shows the operation of the three position pipeline.

FIG. 6A is a schematic diagram 200 showing the timing of the basic pipeline operation. Column 202 uniquely identifies the four clock cycles by number, which are used in the present example. Column 204 identifies by clock cycle, the individual instruction (designated A, B, C, and D) controlling the first stage of the pipeline (labeled AGEN), which decodes the instruction and generates the operand address. Column 206 identifies by clock cycle, the individual instruction controlling the second stage of the pipeline (labeled OP-FETCH). Similarly, column 208 identifies which instruction is in control of the third stage of the pipeline (i.e. ARITH).

For instruction A, the instruction decode and operand address generation functions are performed during clock cycle 1. The operand for instruction A is fetched at clock cycle 2. At clock cycle 3, the arithmetic functions of instruction A are performed and results are stored within the GRS as appropriate.

As can be seen in schematic diagram 200, a single instruction (e.g. instruction A) actually requires three clock cycles to complete. However, because each stage of the pipeline operates simultaneously, under ideal conditions, a different instruction completes arithmetic operations (see column 208) each clock cycle. This provides an effective instruction execution rate of one instruction per clock cycle.

To greatly simplify instruction development, the individual instructions (i.e. instructions A, B, C, and D) are each self sufficient. That is each instruction contains enough information to control each stage of the pipeline during the clock cycle in which that instruction is in control. This arrangement is called staged control in that control information not needed for a particular clock cycle is stored or "staged" for the next clock cycle. Staged control works particularly well when the instructions presented to the pipeline for execution are simple instructions requiring three clock cycles for completion. Because the software developer assumes completion of the Nth instruction before the N+1st, the situation does not arise wherein the N+1st instruction will cause a change to the execution of the Nth instruction.

However, the preferred architecture of the data processing system assumes that the instructions are normally executed in sequence. For instructions causing a branch, the next sequential instruction is not executed. If the Nth instruction is a skip instruction and the skip is taken, the N+2nd instruction rather than the N+1st instruction is the next to be executed. If the Nth instruction is a conditional jump instruction, the instruction at the target address is the next to be executed if the conditions are met. The target address always specifies the next instruction for unconditional jumps.

In many of these situations, the next instruction is at the target address and in a large number of these cases, the location of the next instruction to be executed is not completely known until completion of execution of the present instruction. If the system must complete execution of the Nth instruction before the N+1st or target instruction is fetched, the system must be depiped with the corresponding degradation of performance.

In the present example, it may be that instruction A contains a conditional branch which may determine whether instruction B is to be fetched and executed. Again, the problem could be alleviated by depiping such that instruction A completes its arithmetic operations before instruction B is fetched. This solution would impose a performance penalty each time instruction A must be depiped unnecessarily.

A more satisfactory solution according to the present invention is to operate the pipeline in the normal fashion but provide the means to predict whether the final arithmetic result of instruction A will or will not cause a branch. In this way the machine need not be depiped, if the prediction is correct, thus preserving the performance advantage of the pipeline. Whereas it is true that if the prediction is incorrect, the fetching of instruction B will have been for naught, the performance penalty paid is no greater than had depiping been used to resolve the problem. However, the system according to the present invention will have gained one clock cycle over the depiping approach for each time the prediction is correct.

FIG. 6B is a schematic diagram 210 showing the control staging for the three stage pipeline of the preferred embodiment. To relate this in time, it corresponds to clock cycle 3 of FIG. 6A. The microcode instructions are supplied by control section 104 (see also FIG. 5). Instruction C contains portion 218, which controls AGEN 212 (i.e. the first stage of the pipeline); portion 220, which controls OPFETCH 214 (i.e. the second stage of the pipeline); and portion 222, which controls ARITH 216 (i.e. the third stage of the pipeline). Note that during clock cycle 3, portion 218 is actually in control of AGEN 212. Portions 220 and 222, on the other hand, are staged or stored for use during later clock cycles.

During clock cycle 3, portion 224 of instruction B is in control of OPFETCH 214 and portion 226 is staged for control of ARITH 216 at a later clock cycle (i.e. probably the next clock cycle). That portion of instruction B which controls AGEN 212 has completed its function during clock cycle 2 and has therefore been discarded.

Portion 228 of instruction A is in control of ARITH 216 during clock cycle 3. The remaining two portions of instruction A have been discarded as their control functions were accomplished during previous clock cycles. At the completion of the arithmetic function specified by portion 228, the resultant may be stored in the GRS as appropriate. It is this GRS storage operation which may be aborted as a result of the AGEN function of instruction C or as a result of the AGEN or OPFETCH functions of instruction B.

Figure 7:
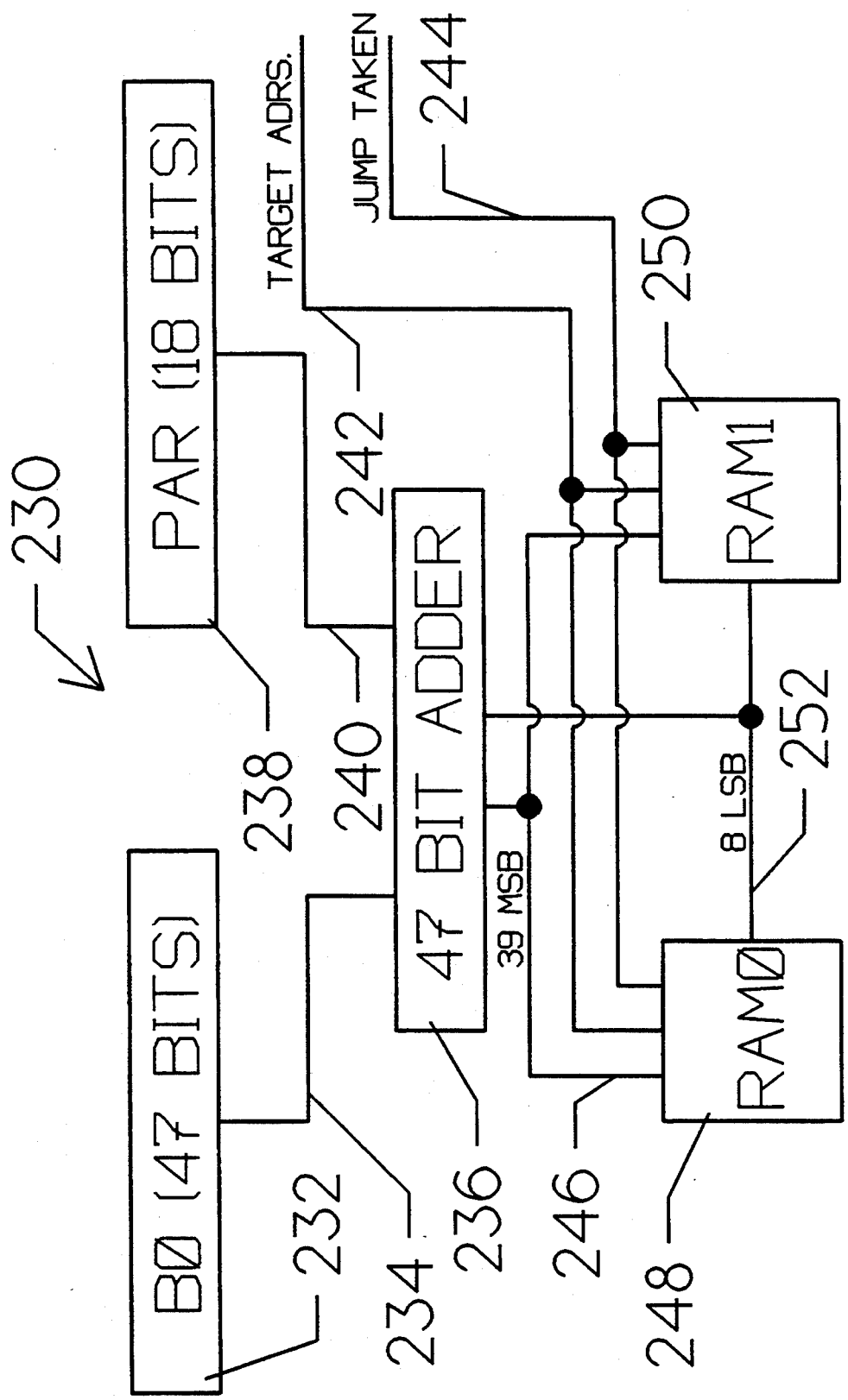
FIG. 7 shows the logic which loads the jump prediction memory.

FIG. 7 is a block diagram 230 of the circuitry which stores the target address for each jump instruction which causes a branch. Unlike many prior art systems, this storage operation occurs any time a branch is taken. The program address register 238 contains the 18 bit relative address of the jump instruction. These 18 bits are supplied via cable 240 to 47 bit adder 236. It is here wherein the 47 bits of the instruction base register (i.e. B0), supplied via cable 234, are added to the contents of program address register 238 to form the absolute address of the jump instruction.

Ram0 248 and ram1 250 are each 256 cell 57 bit random access memories. They are used to store the target addresses for each of the branches taken. Ram0 248 and ram1 250 are addressed via cable 252 by the 8 least significant bits of the sum produced by 47 bit adder 236. The cell as addressed is written if the branch is taken by the jump taken enable received on line 244. This signal is generated by the arithmetic section (see also FIG. 5), if the branch conditions are met.

If the write enable signal is received on line 244, the addressed cell is loaded with the 18 bit relative target address (computed from the operand of the jump instruction) received via cable 242 and the 39 most significant bits of the sum produced by 47 bit adder 236 as received on cable 246. Thus the relative target address is loaded corresponding to the absolute address of each jump wherein the branch actually occurs.

Figure 8:
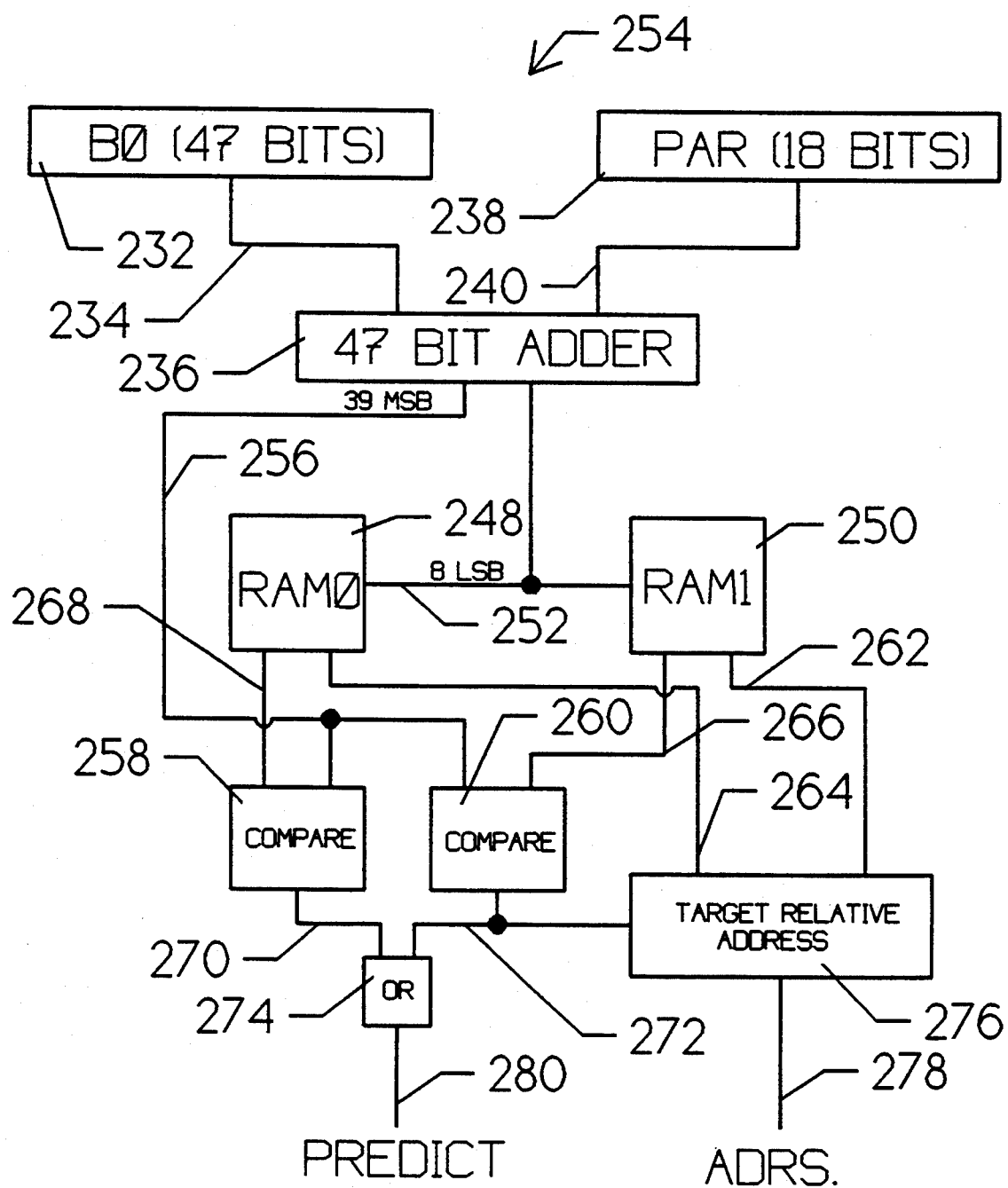
FIG. 8 shows the logic for predicting a branch.

FIG. 8 is a block diagram of the circuitry involved in the prediction of whether a jump instruction is likely to branch and the likely target address of the branch. For each instruction executed, ram0 248 and ram1 250 are addressed via cable 252 from the 8 least significant bits of the absolute address of the instruction executed as described above.

The 39 most significant bits of the cell thus addressed, supplied by cable 266, are compared with the 39 most significant bits of the present instruction, supplied by cable 256, in compare 258 and compare 260. If equality is found, or gate 274 receives a signal via line 270 or 272 and provides a branch prediction signal via line 280.

During the determination of whether a branch was last taken, the 18 bit relative target address is provided to selector 276 via cables 264 and 262. Selection is made based upon the state of line 272 which indicates whether the equality was determined from ram0 248 or ram1 250. The relative target address thus selected is provided by cable 278 for prefetching of the target instruction. All other referenced elements are as previously described.

Figure 9:
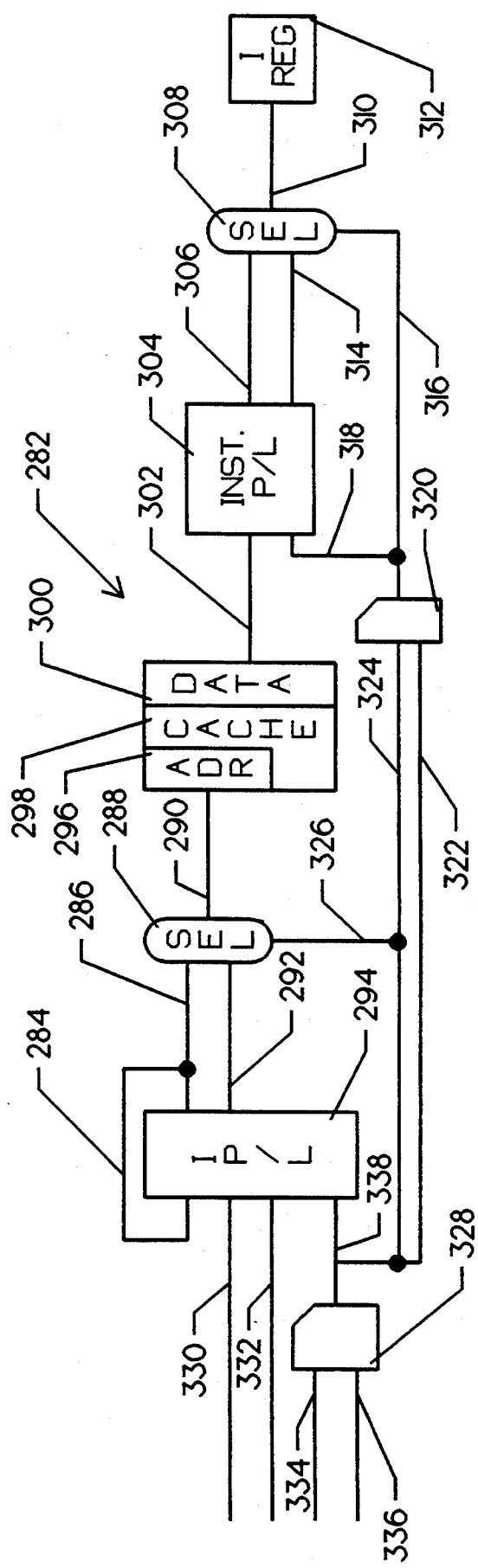
FIG. 9 shows the instruction pipeline under branch prediction.

FIG. 9 is a block diagram 282 showing how the next instruction is fetched. The address of the jump instruction is supplied to instruction pipeline 294 via cable 330. For instructions not causing a branch, for which a branch is not predicted, or when the jump prediction circuitry is disabled, the next instruction address is determined by incrementation via line 284. The predicted target address is received via cable 332 from cable 278 (see also FIG. 8).

Instruction pipeline 294 stages the incremented address and the target address in accordance with the jump prediction circuitry. Line 334 provides the branch prediction signal from line 280 (see also FIG. 8). Line 336 provides a signal indicating that the jump was actually taken. Using these two signals, compare logic 328 is able to determine if a branch was correctly or incorrectly predicted.

The address of the instruction to be fetched is selected by selector 288 from either the next sequential address received via line 286 or the predicted target address received via line 292 based upon whether jump prediction is enabled and whether a branch is predicted as provided by line 326. The selected address is provided to address input 296 of instruction cache 298 via cable 290. The instruction is read from data section 300 of instruction cache 298 in the normal fashion and provided to instruction pipeline 304 via cable 302. Both next sequential and target instructions can be read from instruction cache 298 and staged in instruction pipeline 304. This staging is controlled by compare logic 320 via cable 318. This control is implemented base upon the inputs of cables 322 and 324 which specify whether a prediction was made and if the prediction was subsequently determined to be invalid.

The two instructions thus staged are supplied via cables 306 and 314 to selector 308. Selection is made based upon the state of line 316 which indicates whether a jump was predicted and whether the prediction was correct. If so, the selection can be made before both instructions are completely staged. The selected instruction is transferred via cable 310 to instruction register 312 for execution.

Figure 10:
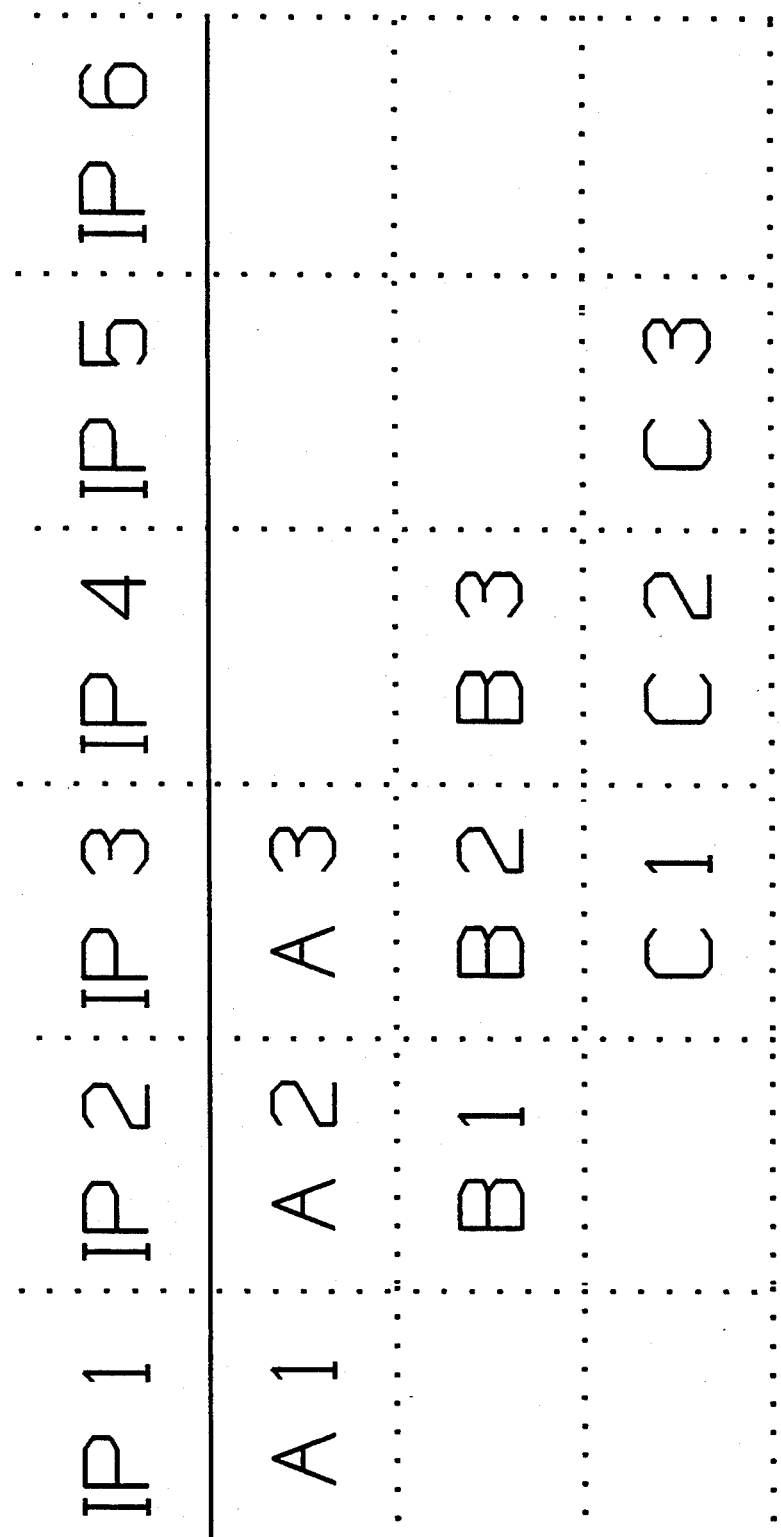
FIG. 10 schematically shows execution of instructions in a fully pipelined fashion.

FIG. 10 is a diagram showing the execution of three instructions within a fully pipelined environment. This is the situation which occurs when there are no branches taken and/or the branches and target addresses are correctly predicted. The top row shows the individual clock cycles IP1, IP2, IP3, IP4, IP5, and IP6. Instruction A is executed over clock cycles IP1–IP3 as shown. Similarly, instruction B is executed over clock cycles IP2–IP4, and instruction C is executed over clock cycles IP3–IP5.

As explained above, skip instructions represent a special case of conditional branch instructions wherein if instruction A is a skip instruction, either instruction B or instruction C will be the next executed instruction depending upon whether the skip condition is or is not met. If the skip is taken, instruction B is simply aborted before data is altered in any addressable register or memory location. The peculiar problem which arises is when skip instruction A modifies an index register at A2 which must be used at B1. In this case, the index register modification may be made too late to yield the expected result.

Figure 11:
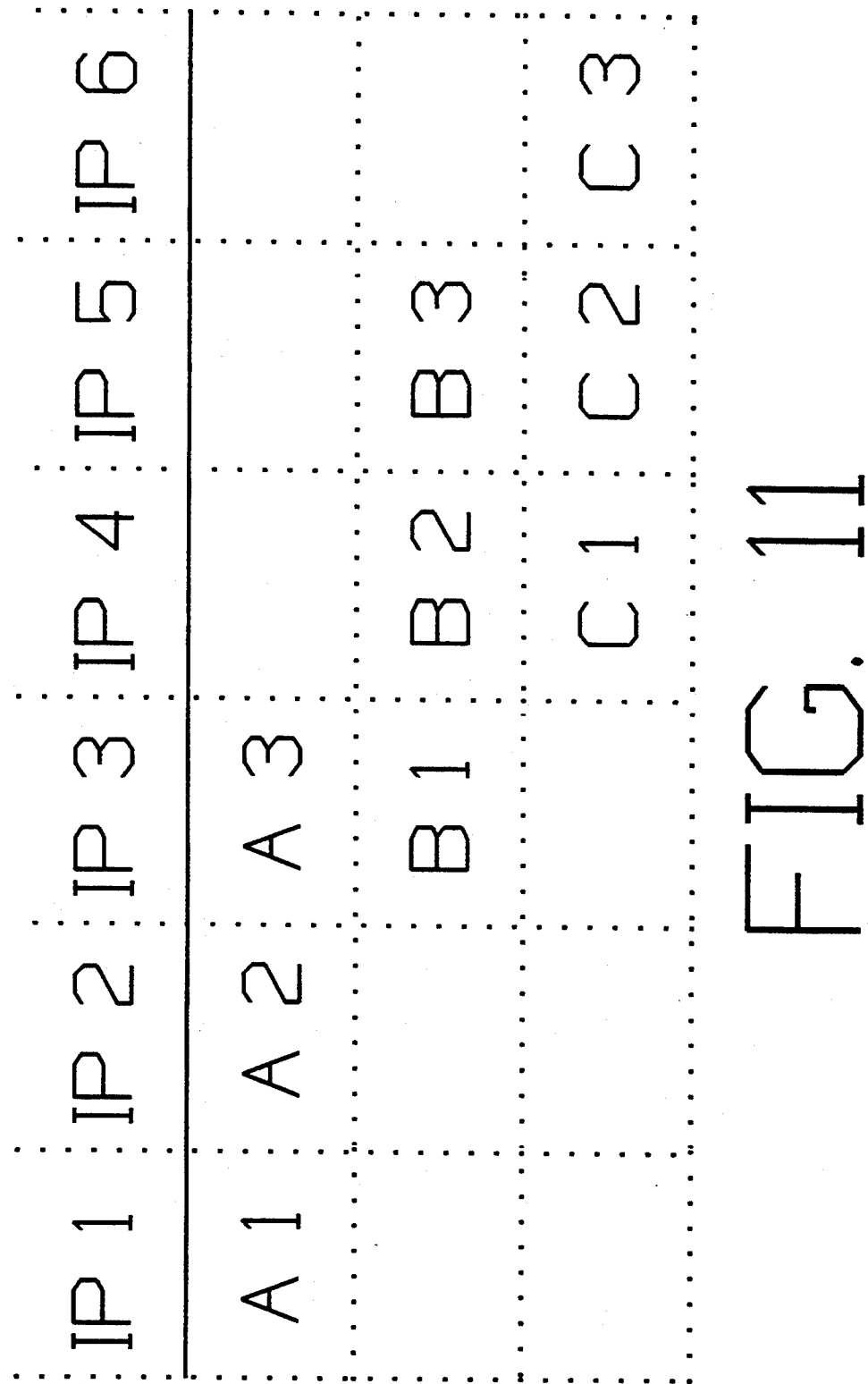
FIG. 11 shows the loss of performance associated with an incorrectly predicted branch.

FIG. 11 illustrates the fully pipelined environment of FIG. 10 wherein skip instruction A modifies an index register at A2 which is used by instruction B at B1. This dependency is identified by comparing the index register field of instruction A with the index register field of instruction B. If equal and not zero, instruction B (along with all subsequent instructions) is delayed one clock cycle. Instruction B is thus executed from IP3–IP5 and instruction C is executed from IP4–IP6.

Figure 12:
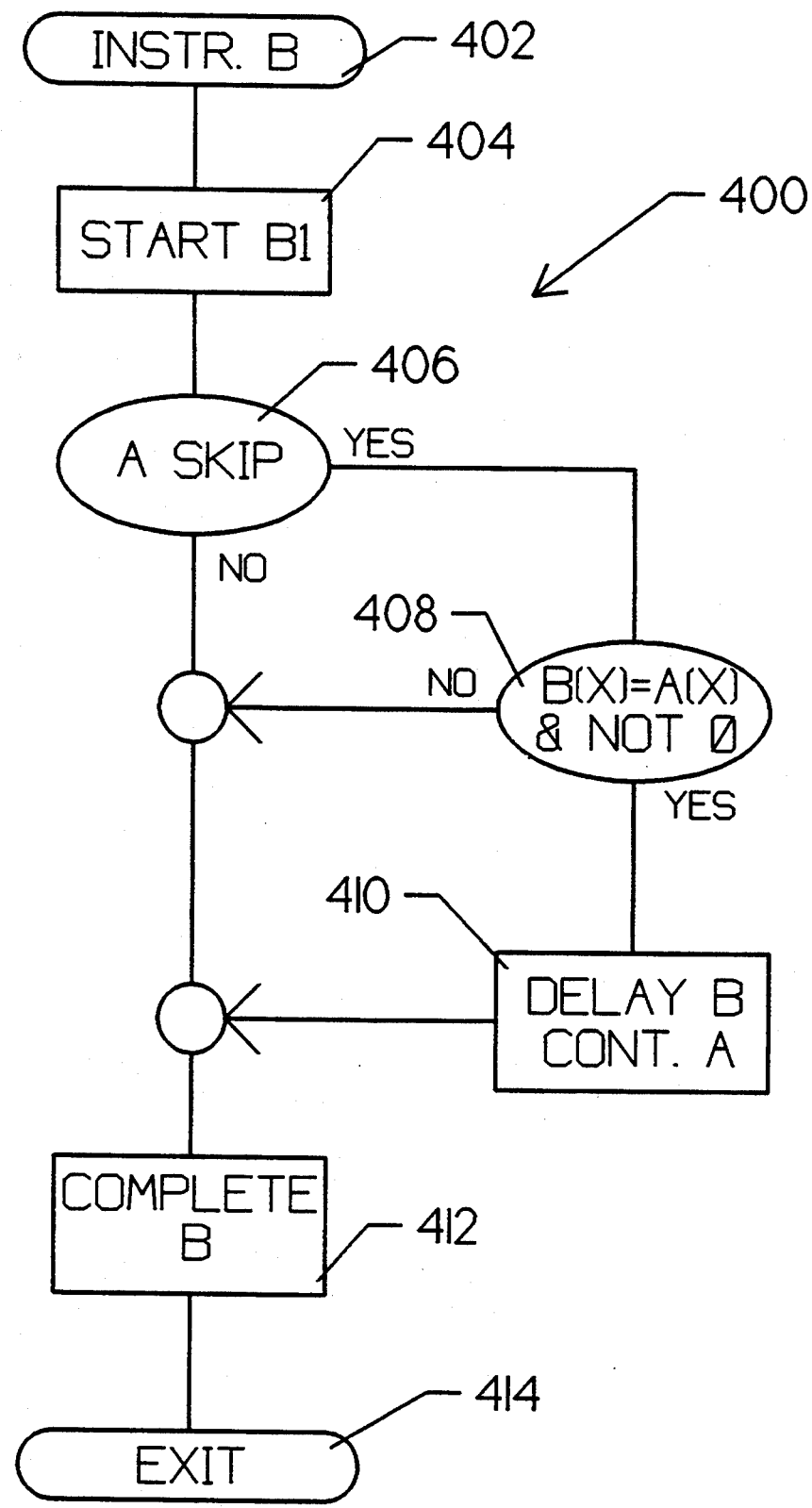
FIG. 12 is a flow diagram for a skip instruction.

FIG. 12 is a flow diagram 400 of the execution of instruction B when instruction A is a skip instruction. Instruction B begins at element 402. Element 404 shows the initiation of step B1. When element 406 determines that instruction A is a skip instruction, control is given to element 408 which compares the index register designators of instructions A and B. If they are equal and not zero, a dependency is determined and element 410 delays B1 until completion of A2 (see also FIG. 11). If element 408 finds inequality or zero, no delay is generated (see also FIG. 10), and control is immediately given to element 412 for continuation of the execution of instruction B. The instruction is completed at element 414.

Having thus described the preferred embodiments of the present invention, those of skill in the art will readily appreciate that the teachings found herein may be applied to yet other embodiments within the scope of the claims hereto attached.

What is claimed is:

1. A method of accommodating an interdependency between a first instruction and a second instruction within a pipelined instruction processor having a plurality of pipeline stages wherein said first instruction has a first index register field and said second instruction has a second index register field and wherein interdependency between said first instruction and said second instruction means that said first index register field and said second index register field are equal and non-zero, said first instruction and said second instruction being sequentially placed within a computer program for sequential execution by said pipelined instruction processor such that said first instruction is executed by a second stage of said pipelined instruction processor simultaneously with the execution of said second instruction by a first stage of said pipelined instruction processor, comprising:

a. determining whether said first instruction is a skip instruction wherein the skip instruction is an instruction that conditionally prevents the execution of the second instruction when the second instruction is positioned in a pipeline stage directly following the pipeline stage of the first instruction such that the second instruction is the next sequential instruction for execution following the first instruction enabling said skip instruction to provide a program branch without requiring a second operand to specify a branch address;

b. comparing said first index register field of said first instruction to said second index register field of said second instruction, the second instruction being positioned in a pipeline stage directly following the pipeline stage of the first instruction such that the second instruction is the next sequential instruction for execution following the first instruction;

c. delaying said second instruction by a predetermined number of pipeline stages if said determining step determines that said first instruction is a skip instruction and said first index register field of said first instruction and said second index register field of said second instruction indicate an interdependence therebetween; and d. executing said second instruction without delay if said determining step determines that said first index register field of said first instruction and said second index register field of said second instruction do not indicate an interdependence therebetween.

2. In a pipelined instruction processor having a plurality of pipeline stages and having means for executing a plurality of instructions wherein interdependency between said first instruction and said second instruction means, that said first index register field and said second index register field are equal and non-zero wherein said plurality of instruction are sequentially placed within a computer program for sequential execution by said pipelined instruction processor such that a first of the plurality of instructions is executed by a second stage of said pipelined instruction processor simultaneously with the execution of a second of the plurality of instructions by a first stage of said pipelined instruction processor, the improvement comprising:

a. determining means for determining whether the first of said plurality of instructions is a skip instruction wherein the skip instruction is an instruction that conditionally prevents the execution of the second instruction when the second instruction is positioned in a pipeline stage directly following the pipeline stage of the first instruction such that the second instruction is the next sequential instruction for execution following the first instruction enabling said skip instruction to provide a program branch without requiring a second operand to specify a branch address;

b. comparing means coupled to said determining means for comparing a first index register field of said first of said plurality of instructions to a second index register field of a second of said plurality of instructions, the second instruction being positioned in a pipeline stage directly following the pipeline stage of the first instruction such that the second instruction is the next sequential instruction for execution following the first instruction; and c. delaying means coupled to said determining means and to said comparing means for delaying execution of said second of said plurality of instructions by a predetermined number of pipeline stages if said determining means determines that said first of said plurality of instructions is a skip instruction and said comparing means determines that said first index register field of said first of said plurality of instructions and said second index register field of said second of said plurality of instructions have an interdependence therebetween.

3. A pipelined instruction processor having a plurality of pipeline stages and having means for executing a plurality of instructions wherein said plurality of instruction are sequentially placed within a computer program for sequential execution by said pipelined instruction processor such that a first of the plurality of instructions is executed by a second stage of said pipelined instruction processor simultaneously with the execution of a second of the plurality of instructions by a first stage of said pipelined instruction processor, comprising:

a. first determining means for determining whether the first of the plurality of instructions is a skip instruction wherein the skip instruction is an instruction that conditionally prevents the execution of the second instruction when the second instruction is positioned in a pipeline stage directly following the pipeline stage of the first instruction such that the second instruction is the next sequential instruction for execution following the first instruction enabling said skip instruction to provide a program branch without requiring a second operand to specify a branch address;

b. second determining means coupled to said first determining means for determining whether the first of the plurality of instructions could affect the data required by a second of the plurality of instructions, the second instruction being positioned in a pipeline stage directly following the pipeline stage of the first instruction such that the second instruction is the next sequential instruction for execution following the first instruction; and c. delaying means coupled to said second determining means for delaying the execution of the second of the plurality of instructions by a predetermined number of pipeline stages if said second determining means determines that the first of the plurality of instructions could affect the data required by the second of the plurality of instructions.

4. A pipelined instruction processor having a plurality of pipeline stages and having means for executing a plurality of instructions wherein interdependency between said first instruction and said second instruction means that said first index register field and said second index register field are equal and non-zero wherein each instruction has an operand and an index register field, said plurality of instructions being sequentially placed within a computer program for sequential execution by said pipelined instruction processor such that a first of the plurality of instructions is executed by a second stage of said pipelined instruction processor simultaneously with the execution of a second of the plurality of instructions by a first stage of said pipelined instruction processor, comprising:

a. first decision element for comparing said operand of the first of the plurality of instruction to a predetermined value thereby determining if said first instruction is a skip instruction wherein the skip instruction is an instruction that conditionally prevents the execution of the second instruction when the second instruction is positioned in a pipeline stage directly following the pipeline stage of the first instruction such that the second instruction is the next sequential instruction for execution following the first instruction enabling said skip instruction to provide a program branch without requiring a second operand to specify a branch address;

b. a second decision element for comparing said index register field of said first of the plurality of instructions to said index register field of the second of the plurality of instructions, the second instruction being positioned in a pipeline stage directly following the pipeline stage of the first instruction such that the second instruction is the next sequential instruction for execution following the first instruction; and c. a delay circuit coupled to said first decision element and further coupled to said second decision element for delaying the execution of said second of the plurality of instructions by a predetermined number of pipeline stages if said first decision element determines that said operand of said first of the plurality of instruction is equal to said predetermined value and said second decision element determines that said index register field of said first of the plurality of instructions and said index register field of said second of the plurality of instructions indicated an interdependence therebetween.

5. A method of improving the speed of executing a skip instruction within a pipelined instruction processor wherein the instruction processor has a means for executing a plurality of instructions and has a plurality of pipeline stages, said plurality of instructions being sequentially placed within a computer program for sequential execution by said pipelined instruction processor such that a first of the plurality of instructions is executed by a second stage of said pipelined instruction processor simultaneously with the execution of a second of the plurality of instructions by a first stage of said pipelined instruction processor, comprising:

a. determining if a first instruction of the plurality of instructions is the skip instruction wherein the skip instruction is an instruction that conditionally prevents the execution of the second instruction when the second instruction is positioned in a pipeline stage directly following the pipeline stage of the first instruction such that the second instruction is the next sequential instruction for execution following the first instruction enabling said skip instruction to provide a program branch without requiring a second operand to specify a branch address;

b. determining if the first instruction of the plurality of instructions could affect the data required by a second instruction of the plurality of instructions, the second instruction being positioned in a pipeline stage directly following the pipeline stage of the first instruction such that the second instruction is the next sequential instruction for execution following the first instruction;

c. delaying execution of the second instruction of the plurality of instructions by a predetermined number of pipeline Stages if it is found that the first instruction of the plurality of instructions could affect the data required by the second instruction of the plurality of instructions; and d. executing the second instruction without delay if determining step (b) determines that the first instruction of the plurality of instructions can not affect the data required by a second instruction of the plurality of instructions.

* * * * *